United States Patent
Eluru et al.

(10) Patent No.: US 10,059,873 B2
(45) Date of Patent: Aug. 28, 2018

(54) INCORPORATION OF CLAY INTO CURABLE RESIN SYSTEM

(71) Applicant: Halliburton Energy Services, Inc., Houston, TX (US)

(72) Inventors: Sairam Eluru, Andhra Pradesh (IN); Sumit Ramesh Songire, Maharashtra (IN)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 0 days.

(21) Appl. No.: 15/560,295

(22) PCT Filed: Jun. 19, 2015

(86) PCT No.: PCT/US2015/036796
§ 371 (c)(1),
(2) Date: Sep. 21, 2017

(87) PCT Pub. No.: WO2016/204793
PCT Pub. Date: Dec. 22, 2016

(65) Prior Publication Data
US 2018/0066176 A1    Mar. 8, 2018

(51) Int. Cl.
*C09K 8/57* (2006.01)
*C08K 3/34* (2006.01)
(Continued)

(52) U.S. Cl.
CPC .......... *C09K 8/5755* (2013.01); *C08K 3/346* (2013.01); *C08K 7/00* (2013.01); *C08K 9/04* (2013.01);
(Continued)

(58) Field of Classification Search
CPC .......... C09K 8/57; C09K 8/5755; C08K 3/34; C08K 3/346; C08K 2201/011; E21B 33/13; E21B 33/138
See application file for complete search history.

(56) References Cited

U.S. PATENT DOCUMENTS 4,857,562 A    8/1989  Wacker et al.
5,873,413 A    2/1999  Chatterji et al.
(Continued)

FOREIGN PATENT DOCUMENTS

EP        0899317 A1    3/1999
WO    2010045480 A2    4/2010

OTHER PUBLICATIONS

Patent Cooperation Treaty, International Search Report and Written Opinion, PCT Appln. PCT/US2015/036796, dated Feb. 29, 2016.
(Continued)

*Primary Examiner* — Zakiya W Bates
*Assistant Examiner* — Crystal J Miller
(74) *Attorney, Agent, or Firm* — McGuireWoods LLP

(57) ABSTRACT

A resin-clay composition includes a first mixture including an epoxy resin and a nano-clay; and a curing agent added to the first mixture to produce a second mixture, wherein a presence of the nano-clay causes a change in curing time of the epoxy resin. The second mixture may be added into a hydrocarbon well for aggregating particulate matter. A percentage of the epoxy resin in the second mixture may include a range of about 10 to about 90 percent. A percentage of the clay in the second mixture may include a range of about 0 to about 20 percent, and wherein a percentage of the curing agent in the second mixture may include a range of about 10 to about 90 percent. The epoxy resin may include Diglycidyl ether of Bisphenol A epoxy resin.

13 Claims, 7 Drawing Sheets

(51) Int. Cl.
*E21B 33/138* (2006.01)
*C09K 8/575* (2006.01)
*C08L 63/00* (2006.01)
*C08K 9/04* (2006.01)
*C08K 7/00* (2006.01)

(52) U.S. Cl.
CPC .............. *C08L 63/00* (2013.01); *C09K 8/572* (2013.01); *C09K 8/5756* (2013.01); *E21B 33/138* (2013.01); *C08K 2201/011* (2013.01); *C08L 2205/025* (2013.01)

(56) References Cited

U.S. PATENT DOCUMENTS

| | | | |
|---|---|---|---|
| 6,503,870 B2 | 1/2003 | Griffith et al. | |
| 8,026,307 B2* | 9/2011 | Miller | B82Y 30/00 |
| | | | 524/437 |
| 8,153,042 B2* | 4/2012 | Miller | B82Y 30/00 |
| | | | 264/131 |
| 2005/0272611 A1 | 12/2005 | Lord | |
| 2007/0072981 A1* | 3/2007 | Miller | B82Y 30/00 |
| | | | 524/445 |
| 2011/0301264 A1* | 12/2011 | Miller | B82Y 30/00 |
| | | | 523/457 |
| 2017/0247598 A1* | 8/2017 | Kennedy | C09K 8/44 |

OTHER PUBLICATIONS

Alfred Tcherbi-Narteh, Mahesh Hosur, Eldon Triggs, and Shaik Jeelani, "Thermal stability and degradation of diglycidyl ether of bisphenol A epoxy modified with different nanoclays exposed to UV radiation", Polymer Degradion and Stability 98 (2013), Jul. 25, 2012, pp. 759-770, vol. 98, Issue 3, Elsevier Ltd.

Alfred Tcherbi-Narteh, Mahesh Hosur, Eldon Triggs, and Shaik Jeelani, "Effects of Surface Treatments of Montmorillonite Nanoclay on Cure Behavior of Diglycidyl Ether of Bisphenol A Epoxy Resin", May 1, 2013, pp. 1-13, vol. 2013, Article ID 864141, Hindawi Publishing Corporation Journal of Nanoscience.

* cited by examiner

INCORPORATION OF CLAY INTO CURABLE RESIN SYSTEM

BACKGROUND

The present disclosure relates to a method and a composition for tuning the curing time of resin systems, and more particularly to a nano-clay and resin composition containing an epoxy resin and a method for their preparation.

Wells are drilled at various depths to access and produce oil, gas, minerals, and other naturally-occurring deposits from subterranean geological formations. Hydrocarbons may be produced through a wellbore traversing the subterranean formations. These subterranean zones often contain unconsolidated particulate matter that can migrate out with hydrocarbon. To mitigate the issue of particulate migration, several resin systems have been developed to consolidate particulate matter in the wells.

BRIEF DESCRIPTION OF THE DRAWINGS

The following figures are included to illustrate certain aspects of the present disclosure, and should not be viewed as exclusive embodiments. The subject matter disclosed is capable of considerable modifications, alterations, combinations, and equivalents in form and function, without departing from the scope of this disclosure.

DETAILED DESCRIPTION OF ILLUSTRATIVE EMBODIMENTS

Figure 1A:
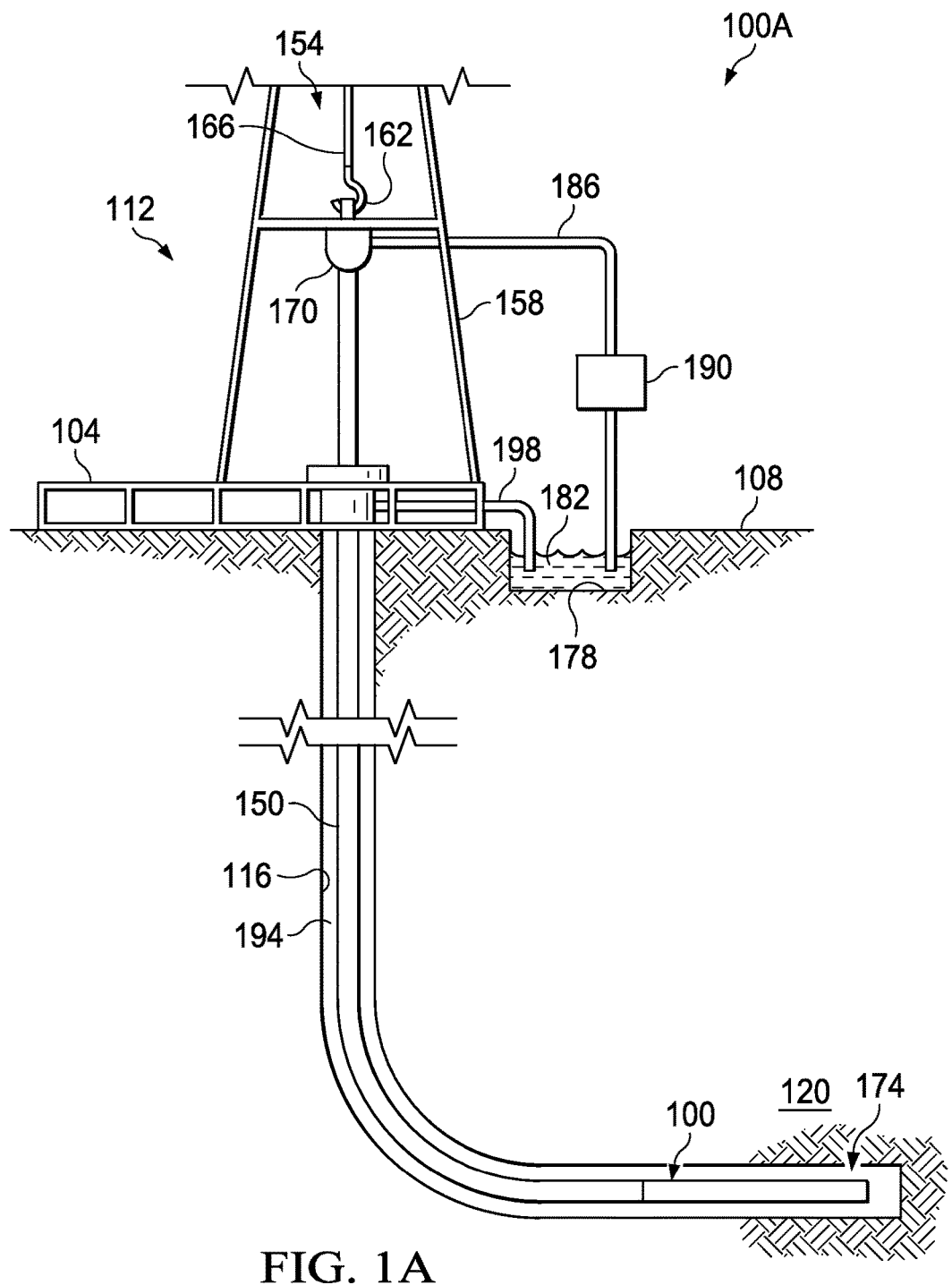
FIG. 1A illustrates a schematic view of an on-shore well having a completion system according to an illustrative embodiment.

In the following detailed description of the illustrative embodiments, reference is made to the accompanying drawings that form a part hereof These embodiments are described in sufficient detail to enable those skilled in the art to practice the invention, and it is understood that other embodiments may be utilized and that logical structural, mechanical, electrical, and chemical changes may be made without departing from the spirit or scope of the invention. To avoid detail not necessary to enable those skilled in the art to practice the embodiments described herein, the description may omit certain information known to those skilled in the art. The following detailed description is, therefore, not to be taken in a limiting sense, and the scope of the illustrative embodiments is defined only by the appended claims.

The terms "including", "comprising" and variations thereof, as used in this disclosure, mean "including, but not limited to", unless expressly specified otherwise.

The terms "a", "an", and "the", as used in this disclosure, means "one or more", unless expressly specified otherwise.

Although process steps, method steps, or the like, may be described in a sequential order, such processes and methods may be configured to work in alternate orders. In other words, any sequence or order of steps that may be described does not necessarily indicate a requirement that the steps be performed in that order. The steps of the processes or methods described herein may be performed in any order practical.

Further, some steps may be performed simultaneously.

The term "about" means +/−10.

Unless otherwise specified, any use of any form of the terms "connect," "engage," "couple," "attach," or any other term describing an interaction between elements is not meant to limit the interaction to direct interaction between the elements and may also include indirect interaction between the elements described. In the following discussion and in the claims, the terms "including" and "comprising" are used in an open-ended fashion, and thus should be interpreted to mean "including, but not limited to". Unless otherwise indicated, as used throughout this document, "or" does not require mutual exclusivity.

As used herein, the phrases "hydraulically coupled," "hydraulically connected," "in hydraulic communication," "fluidly coupled," "fluidly connected," and "in fluid communication" refer to a form of coupling, connection, or communication related to fluids, and the corresponding flows or pressures associated with these fluids. In some embodiments, a hydraulic coupling, connection, or communication between two components describes components that are associated in such a way that fluid pressure may be transmitted between or among the components. Reference to a fluid coupling, connection, or communication between two components describes components that are associated in such a way that a fluid can flow between or among the components. Hydraulically coupled, connected, or communicating components may include certain arrangements where fluid does not flow between the components, but fluid pressure may nonetheless be transmitted such as via a diaphragm or piston.

While a portion of a wellbore may, in some instances, be formed in a substantially vertical orientation, or relatively perpendicular to a surface of the well, the wellbore may, in some instances, be formed in a substantially horizontal orientation, or relatively parallel to the surface of the well. The wellbore may include portions that are partially vertical (or angled relative to substantially vertical) or partially horizontal (or angled relative to substantially horizontal).

The present disclosure relates generally to a resin-clay composition that mitigates particulate migration during hydrocarbon production. The resin-clay composition involves a thin coating of resin around a surface of the particulate which, when cured, holds the particulate in place, which gives enough strength against the dragging forces during production of hydrocarbon such as, for example, oil, gases, and the like. The composition and methods described herein assist in tuning the curing time of the resin without changing concentration of resin and hardener (e.g., curing agent) in order to maintain the same consolidation strength.

FIG. 1A illustrates a schematic view of a rig 104 operating an onshore drilling or production system 100A according to an illustrative embodiment. Rig 104 is positioned at a surface 108 of a well 112. The well 112 includes a wellbore 116 that extends from the surface 108 of the well 112 to a subterranean substrate or formation 120. The well 112 and rig 104 are illustrated onshore in FIG. 1A.

Figure 1B:
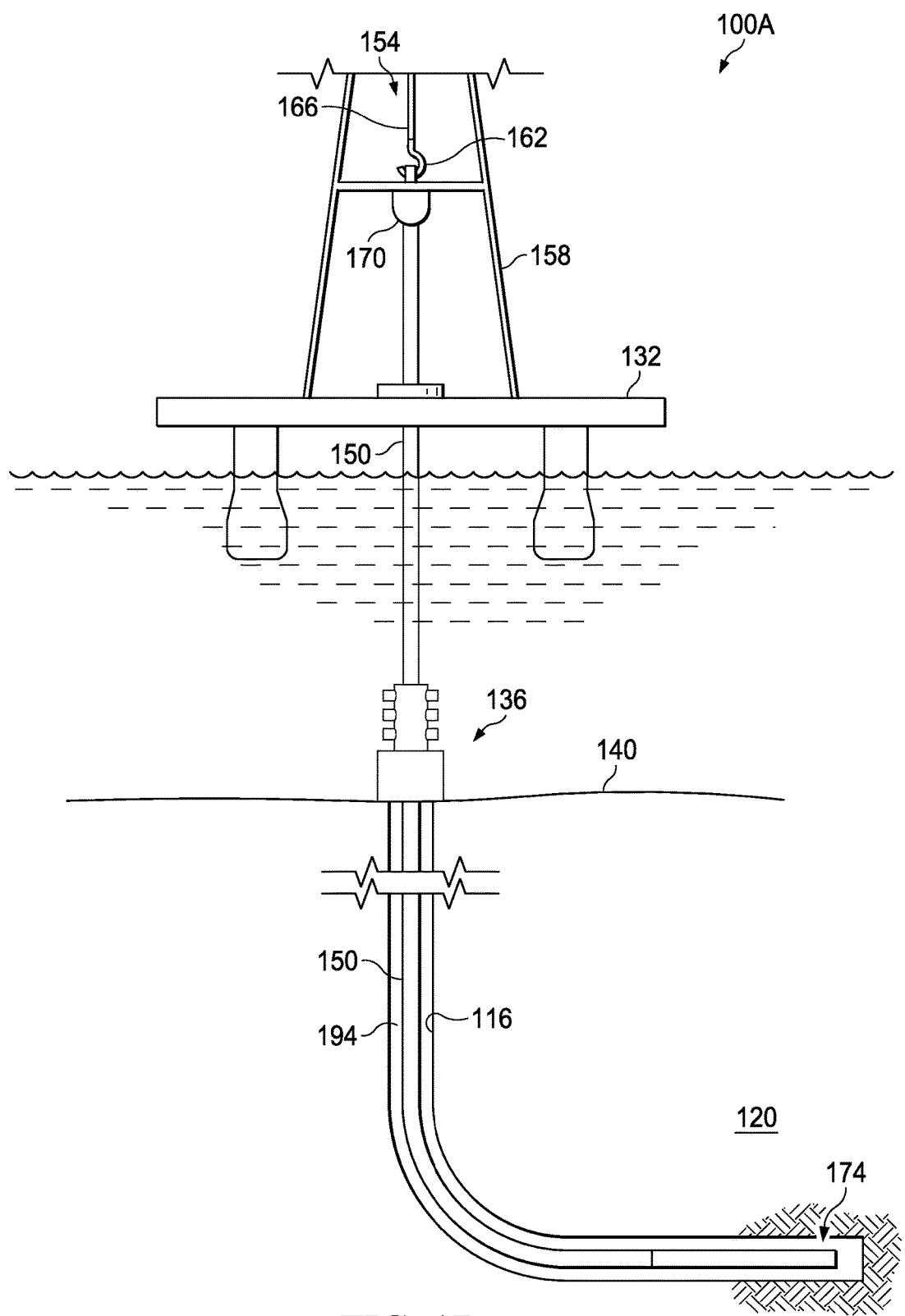
FIG. 1B illustrates a schematic view of an off-shore well having a completion system according to an illustrative embodiment.

Alternatively, FIG. 1B illustrates a schematic view of an off-shore platform 132 operating an offshore drilling or production system 100B according to an illustrative embodiment. The offshore drilling or production system 100B may be deployed in a sub-sea well 136 accessed by the offshore platform 132. The offshore platform 132 may be a floating on platform or may instead be anchored to a seabed 140.

FIGS. 1A and 1B each illustrate possible uses or deployments of a resin-clay composition according to principles of this disclosure, and while the following description of the systems 100A-B primarily focusses on the use of the systems 100A-B during the completion and production stages, the systems 100A-B also may be used in other stages of the well.

In the embodiments illustrated in FIGS. 1A and 1B, the wellbore 116 has been formed by a drilling process in which dirt, rock and other subterranean material is removed to create the wellbore 116. During or after the drilling process, a portion of the wellbore may be cased with a casing (not illustrated in FIGS. 1A and 1B). In other embodiments, the wellbore 116 may be maintained in an open-hole configuration without casing. The embodiments described herein are applicable to either cased or open-hole configurations of the wellbore 116.

After drilling of the wellbore 116 is complete and the associated drill bit and drill string are "tripped" from the wellbore 116, a work string or tubing string 150, which may eventually function as a production string, is lowered into the wellbore 116.

The work string 150 may include sections of tubing, each of which are joined to adjacent tubing by threaded or other connection types. The work string may refer to the collection of pipes or tubes as a single component, or alternatively to the individual pipes or tubes that comprise the string. The term work string (or tubing string or production string) is not meant to be limiting in nature and may refer to any component or components that are capable of being coupled to the systems 100A-B to inject the resin-clay composition into the wellbore 116, or to provide energy to the systems 100A-B, such as that provided by fluids, electrical power or signals, or mechanical motion. Mechanical motion may involve rotationally or axially manipulating portions of the work string 150. In some embodiments, the work string 150 may include a passage disposed longitudinally in the work string 150 that is capable of allowing fluid communication between the surface 108 of the well 112 and a downhole location 174. The resin-clay composition may be injected into the well 112 via the passage prior to or after commencement of hydrocarbon production.

The lowering of the work string 150 may be accomplished by a lift assembly 154 associated with a derrick 158 positioned on or adjacent to the rig 104, 132. The lift assembly 154 may include a hook 162, a cable 166, a traveling block (not shown), and a hoist (not shown) that cooperatively work together to lift or lower a swivel 170 that is coupled to an upper end of the work string 150. The work string 150 may be raised or lowered as needed to add additional sections of tubing to the work string 150 to position the systems 100A-B at the downhole location 174 in the wellbore 116.

A reservoir 178 may be positioned at the surface 108 to hold a fluid 182 (e.g., hydrocarbon, resin-clay composition, or the like) for delivery to the well 112 during setting of the systems 100A-B. A supply line 186 is fluidly coupled between the reservoir 178 and the passage of the work string 150. A pump 190 drives the fluid 182 through the supply line 186 and the work string 150 toward the downhole location 174. As described in more detail below, the fluid 182 may also be used to carry out debris from the wellbore prior to or during the completion process. After traveling downhole, the fluid 182 returns to the surface 108 by way of an annulus 194 between the work string 150 and the wellbore 116. At the surface 108, the fluid may be returned to the reservoir 178 through a return line 198. The fluid 178 may be filtered or otherwise processed prior to recirculation through the well 112.

Figure 2:
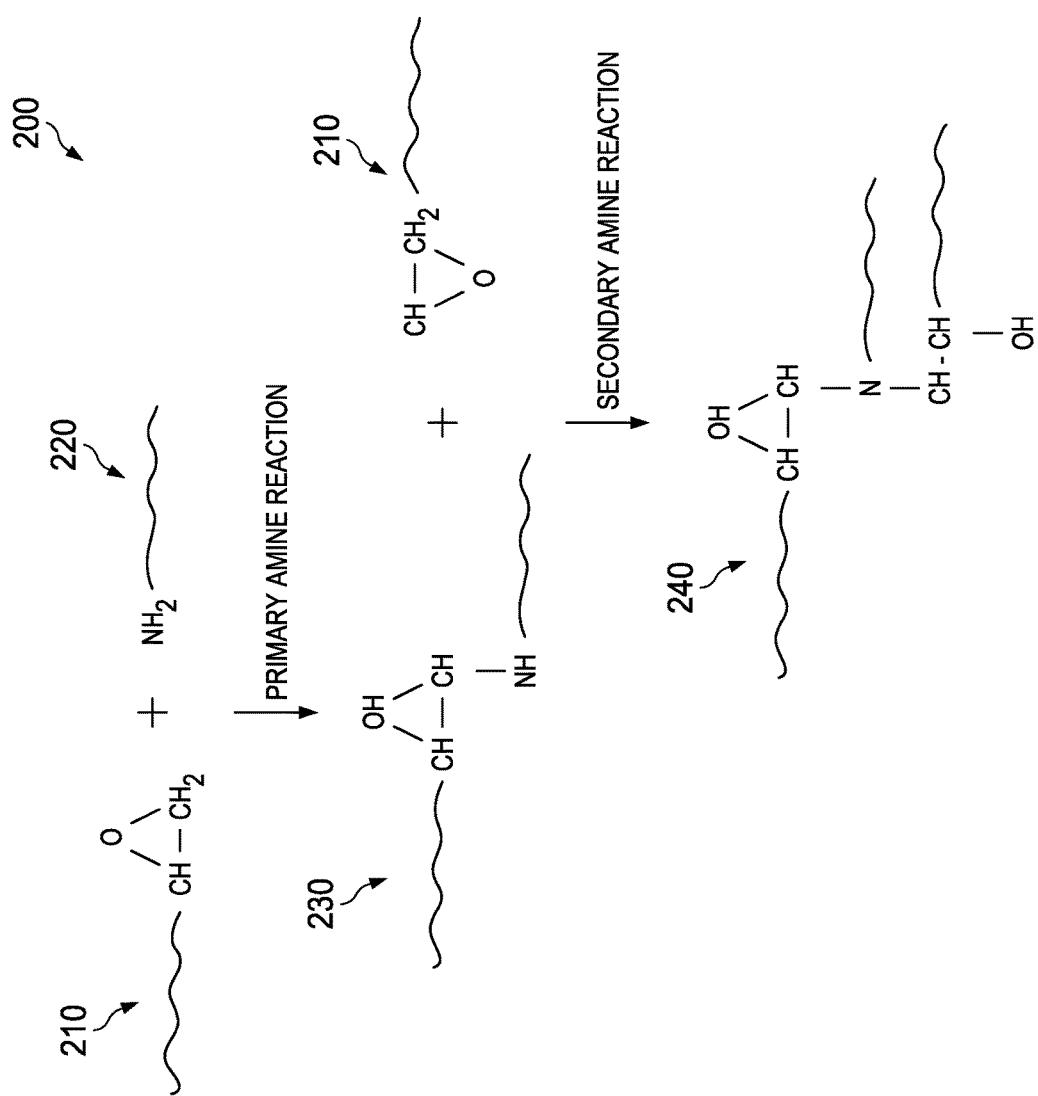
FIG. 2 illustrates an example of epoxy-amine curing reaction according to the principles of the disclosure.

FIG. 2 illustrates an example of epoxy-amine curing reaction 200 according to the principles of the disclosure. The epoxy-amine curing reaction may result in production of a resin-clay composition in accordance with the principles of the present disclosure. The epoxy-amine curing may include mixing an epoxy resin 210 and amine based curing agent 220 which forms a cross link between an epoxy group of the resin 210 and an amine group on the curing agent 220. The process may be repeated to carry out a secondary amine reaction with an addition of yet another epoxy resin 210.

The epoxy resin 210 may include at least one of diglycidyl ether of Bisphenol A epoxy resin, polyepoxide obtained by reacting an epihalohydrin with at least one member selected from the group consisting of polyhydric phenol and polyhydric alcohol and combination of both. The concentration of the epoxy resin may vary from about 0 to about 100 percent.

The curing agent may include at least one of cycloaliphatic amine, cycloaliphatic amines, imidazoles, teriary amines, aromatic amines, and their combinations. The concentration of the curing agent may vary from about 0 to about 100 percent.

In another embodiment of the present disclosure, a substitute resin such as, for example, Furans, Phenolics, and the like, may be used in place of the epoxy resin 210.

In an embodiment of the present disclosure, the primary amine reaction may be preceded by addition of a nano-clay (as shown in e.g., FIG. 5) into the epoxy resin 210. The addition of the nano-clay into the epoxy resin 210 may result in different morphologies such as, for example, exfoliated, flocculated, intercalated, and the like, which will influence polymer network structure of the nano-clay and its overall properties. During processing, these clays may orient along the mesoscale structure and influences rheology. Interaction between the nano-clay and epoxy molecules affects viscosities and alters the mobility of reacting groups during curing which is responsible for delayed/faster curing. The nano-clay may also modify the surface of the epoxy resin 210. After the nano-clay is added to the epoxy resin 210, a curing agent may be added wherein the modified surface of the epoxy resin 210 by the nano-clay may alter the curing time. The curing time may be decreased or increased based on which clay is used.

Figure 3:
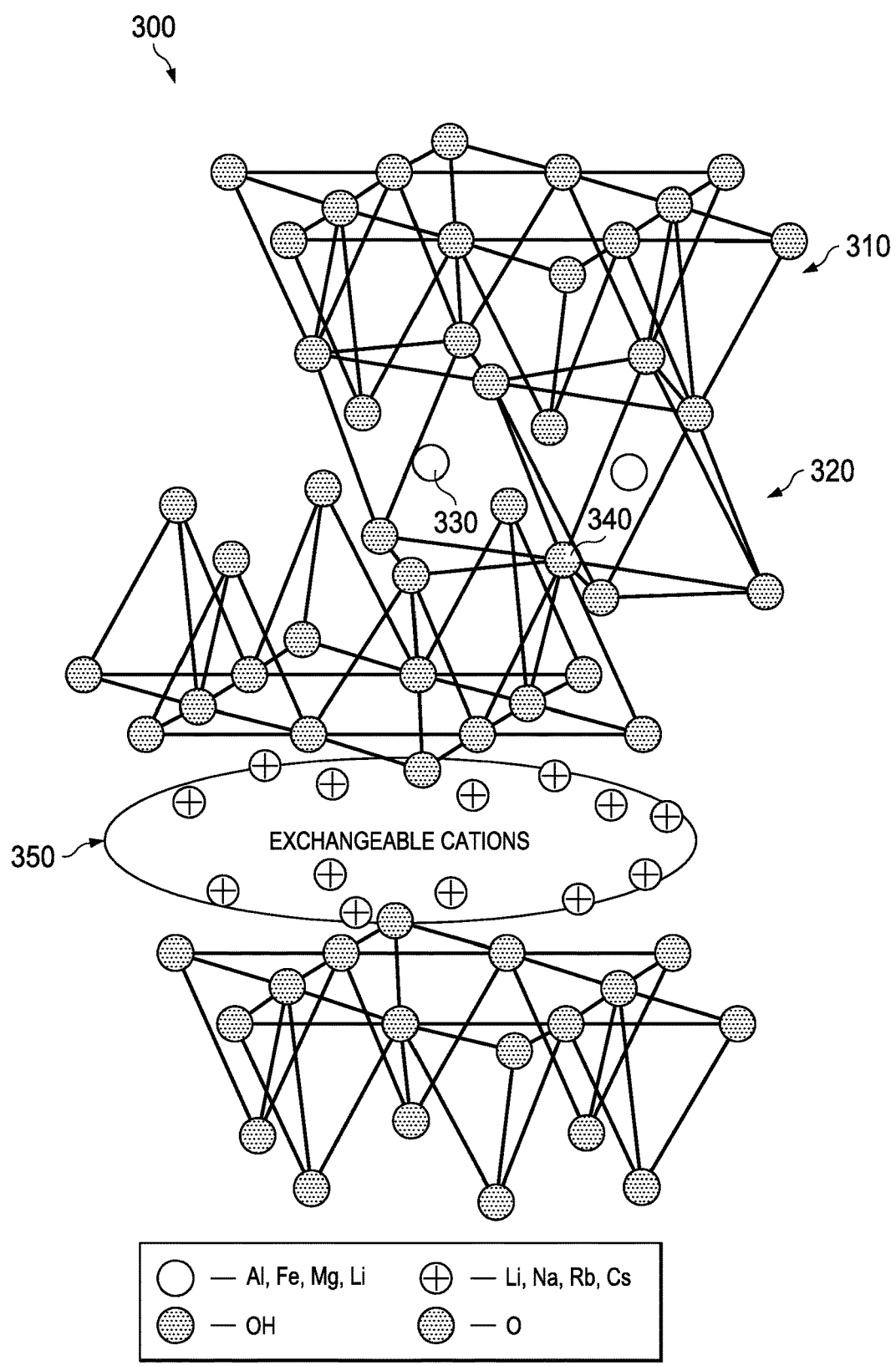
FIG. 3 illustrates an example of a chemical structure of clays used according to the principles of the disclosure.

FIG. 3 illustrates an example of a nano-clay 300 constructed according to the principles of the disclosure. The nano-clay 300 may include two-dimensional sheets of a tetrahedral silicate sheet 310 and an octahedral hydroxide sheet 320. The tetrahedral silicate sheet 310 may include $SiO_4$. The octahedral hydroxide sheet 320 may include $AlO_4$. The tetrahedral silicate sheet 310 and the octahedral hydroxide sheet 320 units may share a corner and may further include a chemical composition $(Al,Si)_3O_4$.

Each tetrahedral silicate sheet 310 may share three of its vertex oxygen atoms 340 with the other tetrahedral silicate sheet 310 forming a hexagonal array in two-dimensions. The unshared vertex from the tetrahedral silicate sheet 310 may also form part of one side of the octahedral hydroxide sheet 320, but an additional oxygen atom 340 may be located above the gap in the tetrahedral silicate sheet 310. This oxygen atom 340 may be bonded to a hydrogen atom in the octahedral hydroxide sheet 320 forming an OH group 340 in the nano-clay structure.

The bonding of the tetrahedral silicate sheet 310 to the octahedral hydroxide sheets 320 may be formed from at least one cation 350, and coordinated by six oxygen atoms 340. The cation may be exchangeable cations and include at least one of Nanomer I.28 E-quaternary trimethyl, Stearyl ammonium, Cloisite 10A-quaternary benzyl, Hydrogenated tallow ammonium, Cloisite 30B-quaternary, Dimethyl dihydrogenated tallow, and ammonium. The cation may further include Al, Fe, Mg, Li, and the like.

The nano-clay 300 may be formed in a layer of 2:1 ratio wherein a single octahedral hydroxide sheet 320 may be packed between the two tetrahedral silicate sheets 310. The layer may further include a 1:1 ratio wherein one tetrahedral silicate sheet 310 and one octahedral hydroxide sheet 320 may be linked together.

Based on the composition of the tetrahedral silicate sheet 310 and the octahedral hydroxide sheet 320, the layer may have no charge, or have a net negative charge. If the layer is charged, this charge may be balanced by interlayer cation 330. The interlayer cation may include at least one of Al, Fe, Mg, Li, Na$^+$, and K$^+$. In each case, an interlayer (e.g., a space between the layer) of the nano-clay 300 may also include $H_2O$.

The crystal structure may be formed from a stack of nano-clay 300 interspaced with the interlayers. The addition of nano-clay 300 into a resin (e.g., epoxy resin) may result in delay or acceleration of the curing process. Currently existing resin systems have limitations in treatment intervals because of shorter curing times. Being able to control the curing time may assist with hydrocarbon production by resin treatment for consolidation of particulates at a controlled speed.

As shown in Table 1 below, different nano-clays may have a varying impact on the rheology and curing time of the resin. An addition of SC-15 composite into the resin results in a range of a gel time of 3451 seconds at 60° C. to 391 seconds at 90° C. Addition of SC-15 and Nanomer I.28E result in a range of gel time of 5851 seconds at 60° C. to gel time of 841 seconds at 90° C. Addition of SC-15 and Closite 10A result in a range of gel time of 3007 seconds at 60° C. to gel time of 474 seconds at 90° C. Addition of SC-15 and Closite 30B result in a range of gel time of 3275 seconds at 60° C. to a gel time of 326 seconds at 90° C. The addition of nanomer I.28E to the resin resulted in a delay in the curing process whereas an addition of closite 10A and 30B accelerated the curing time at a particular temperature.

TABLE 1

Rheology and Curing Data

| Sample | Cure temperature, ° C. | Gel time, s | Storage modulus, at gel point, Pa | Viscosity at gel point, Pa · s |
|---|---|---|---|---|
| SC-15 composite | 60 | 3451 | 43810 | 9844 |
|  | 70 | 1801 | 30380 | 6882 |
|  | 80 | 1001 | 8884 | 2977 |
|  | 90 | 391 | 4606 | 1027 |
| SC-15/Nanomer I.28E | 60 | 5851 | 98170 | 22570 |
|  | 70 | 3131 | 28260 | 6109 |
|  | 80 | 1491 | 12010 | 2138 |
|  | 90 | 841 | 4767 | 1073 |
| SC-15/Cloisite 10A | 60 | 3007 | 92680 | 20820 |
|  | 70 | 1616 | 27690 | 6197 |

TABLE 1-continued

Rheology and Curing Data

| Sample | Cure temperature, ° C. | Gel time, s | Storage modulus, at gel point, Pa | Viscosity at gel point, Pa · s |
|---|---|---|---|---|
|  | 80 | 646 | 10400 | 2352 |
|  | 90 | 474 | 7761 | 1743 |
| SC-15/Cloisite 30B | 60 | 3275 | 58920 | 13280 |
|  | 70 | 1597 | 28650 | 6451 |
|  | 80 | 566 | 7166 | 1663 |
|  | 90 | 326 | 6374 | 1378 |

Figure 4A:
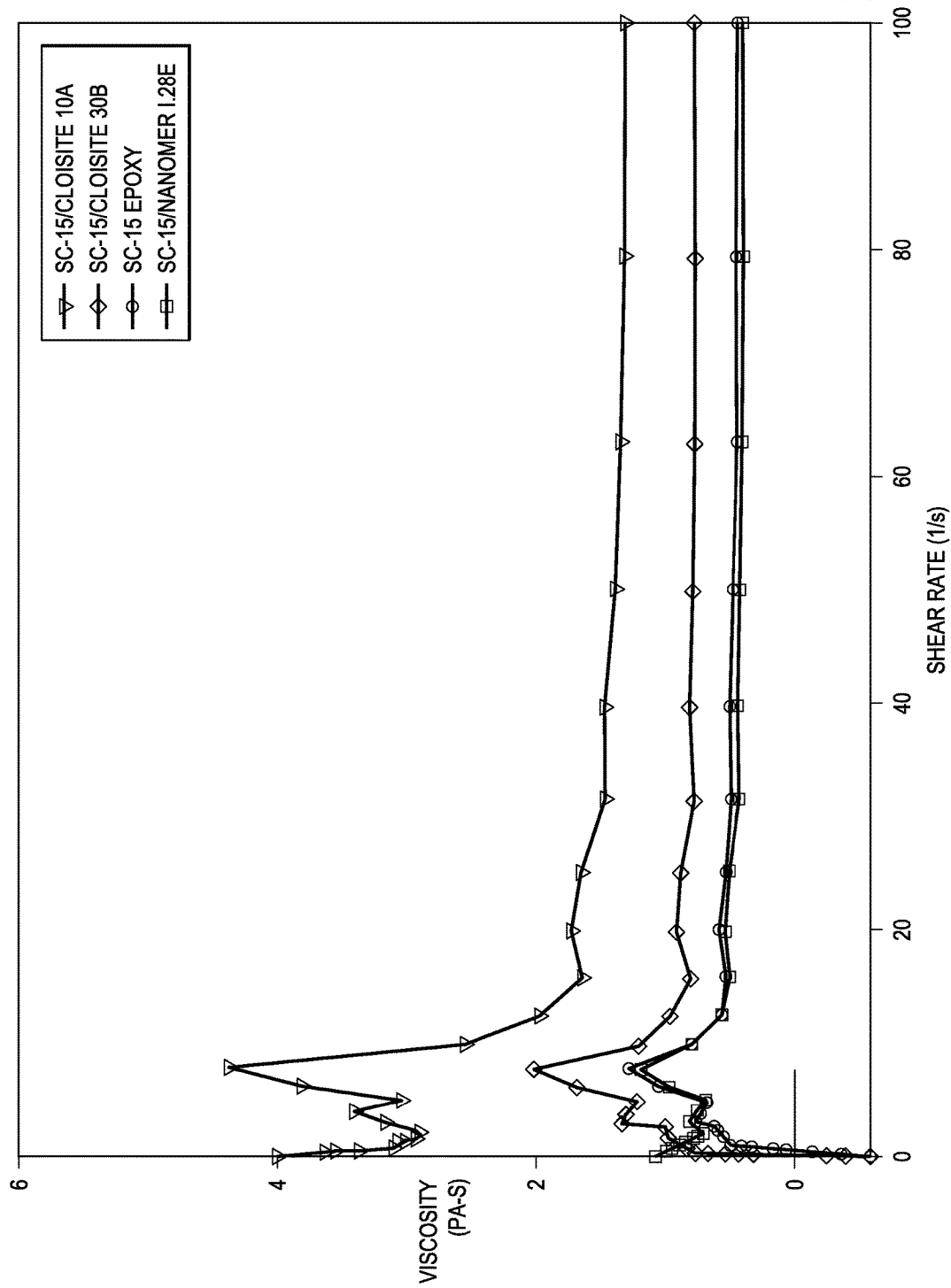
FIG. 4A illustrates an example of an influence of clays on rheology according to the principles of the disclosure.
Figure 4B:
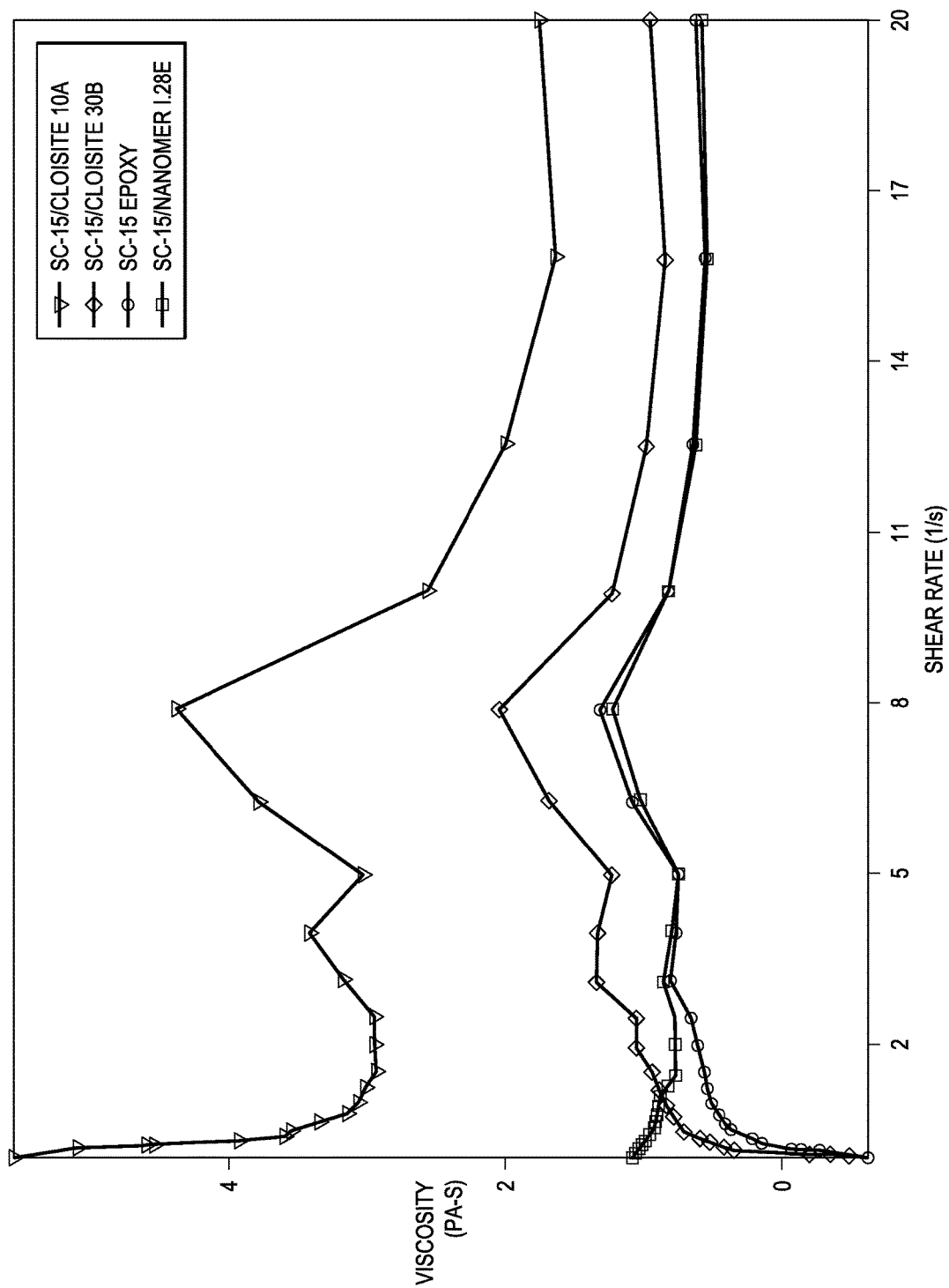
FIG. 4B illustrates yet another example of an influence of clays on rheology according to the principles of the disclosure.

FIGS. 4A and 4B show an influence of nano-clay on rheology. As shown in FIGS. 4A and 4B, a viscosity of nanomer I.28E added resin remained almost the same as that of unmodified SC-15 added resin, whereas closite added resins showed little increase in viscosity.

Figure 5:
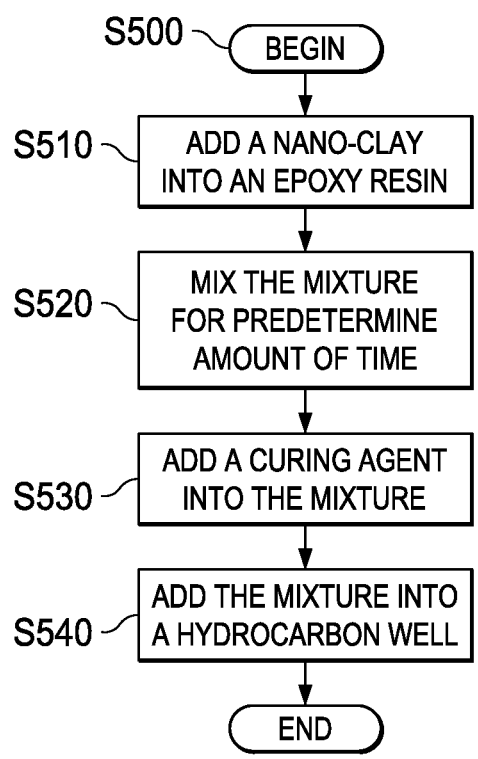
FIG. 5 illustrates an example of a method for mitigating particulate migration during hydrocarbon production according to the principles of the disclosure.

FIG. 5 illustrates an example of a method for mitigating particulate migration during hydrocarbon production according to the principles of the disclosure. As shown in FIG. 5, a nano-clay may be added to an epoxy resin to create a first mixture (Step 510). The first mixture may be mixed for a predetermined amount of time as to allow uniform mixing and appropriate reaction time between the nano-clay and the epoxy resin (Step 520). They may be mixed together by, e.g., shear mixing. After mixing, a curing agent may be added into the first mixture to create a second mixture (Step 530). The second mixture may be mixed for a predetermined amount of time (not shown). The second mixture may then be pumped into a hydrocarbon well (Step 540). Within a hydrocarbon well, the second mixture may harden unconsolidated particulates (e.g., sand) in the hydrocarbon well and hold the particulates in place, providing resistance against dragging forces during production of hydrocarbon.

During hydrocarbon production, it is important to minimize unconsolidated particulates from migrating out with produced hydrocarbons. The present disclosure describes composition and methods that allow tuning of curing time of particulates during hydrocarbon production without changing concentration of resin and curing agent. In addition to the embodiments described above, many examples of specific combinations are within the scope of the disclosure, some of which are detailed below.

According to an aspect of the present disclosure, a resin-clay composition that mitigates particulate migration during hydrocarbon production is disclosed. The resin-clay composition includes a first mixture including an epoxy resin and a nano-clay;

and a curing agent added to the first mixture to produce a second mixture, wherein a presence of the nano-clay causes a change in curing time of the epoxy resin. The second mixture may be added into a hydrocarbon well for aggregating particulate matter. The percentage of the epoxy resin in the second mixture may include a range of about 0 to about 90 percent. The percentage of the clay in the second mixture may include a range of about 0 to about 20 percent, and wherein a percentage of the curing agent in the second mixture may include a range of about 0 to about 90 percent.

The epoxy resin may include at least one of Diglycidyl ether of Bisphenol A epoxy resin, polyepoxide obtained by reacting an epihalohydrin with at least one member selected from the group consisting of polyhydric phenol and polyhydric alcohol, and combination of both.

The curing agent may include at least one of a cyclo-aliphatic amine, cyclo-aliphatic amine, group of aliphatic amines, cycloaliphatic amines, imidazoles, teriary amines, aromatic amines, and their combinations.

The nano-clay may include at least one of Nanomer I.28E, Closite 10A, and Closite 30B. The nano-clay further may further include a two-dimensional sheet. The two-dimensional sheet further may include at least one of tetrahedral and octahedral sheet. The two-dimensional sheet further comprises at least one exchangeable cation.

The at least one exchangeable cation may include at least one of Nanomer I.28E-quaternary trimethyl, Stearyl ammonium, Cloisite 10A-quaternary benzyl, Hydrogenated tallow ammonium, Cloisite 30B-quaternary, Dimethyl dihydrogenated tallow, and ammonium.

The change in curing time may be an increase in curing time. In an alternative, the change in curing time may be a decrease in curing time.

In another aspect of the present disclosure, a method for mitigating particulate migration during hydrocarbon production is disclosed. The method includes adding a nano-clay into an epoxy resin to create a first mixture; and adding a curing agent into the first mixture to create a second mixture.

The method may further include mixing the first mixture for a predetermined amount of time prior to adding the curing agent.

The method may further include inserting the second mixture into a hydrocarbon well for mitigating particulate migration during hydrocarbon production.

The method may further include mixing the second mixture for a predetermined amount of time prior to inserting the second mixture into a hydrocarbon well.

The epoxy resin may include at least one of Diglycidyl ether of Bisphenol A epoxy resin, polyepoxide obtained by reacting an epihalohydrin with at least one member selected from the group consisting of polyhydric phenol and polyhydric alcohol, and combination of both.

The curing agent may include at least one of a cyclo-aliphatic amine, cyclo-aliphatic amine, group of aliphatic amines, cycloaliphatic amines, imidazoles, teriary amines, aromatic amines, and their combinations.

The nano-clay comprises at least one of Nanomer I.28E, Closite 10A, and Closite 30B.

In yet another aspect of the present disclosure, a resin-clay composition is disclosed. The resin-clay composition includes an epoxy resin system prepared from an epoxy resin and an amine based curing agent; and a nano-clay having two-dimensional sheets with the epoxy resin and at least one exchangeable cation separating the two-dimensional sheets, wherein the two dimensional sheets further include at least one of tetrahedral and octahedral sheet, wherein the composition includes between about 0 and about 20 weight percent of the nano-clay, between about 0 to about 90 weight percent of the epoxy resin, and between about 0 to about 90 weight percent of the curing agent, and wherein the nano-clay modifies a surface of the epoxy resin to affect curing time of the epoxy resin.

It should be apparent from the foregoing that embodiments of the invention having significant advantages have been provided. While the embodiments are shown in only a few forms, the embodiments are not limited but are susceptible to various changes and modifications without departing from the spirit thereof.

We claim:

1. A resin-clay composition comprising:
a first mixture comprising an epoxy resin and a nano-clay; wherein the nano-clay forms two-dimensional sheets with the epoxy resin and has at least one exchangeable cation separating the two-dimensional sheets, wherein the two dimensional sheets further comprise at least one of tetrahedral and octahedral sheet, and
an amine based curing agent added to the first mixture to produce a second mixture; wherein the second mixture comprises up to 20 weight percent of the nano-clay, up to 90 weight percent of the epoxy resin, and up to 90 weight percent of the curing agent; wherein the nano-clay modifies a surface of the epoxy resin to affect curing time of the epoxy resin; wherein a presence of the nano-clay causes a change in curing time of the epoxy resin.

2. The resin-clay composition of claim 1, wherein the second mixture is added into a hydrocarbon well for aggregating particulate matter.

3. The resin-clay composition of claim 1, wherein the epoxy resin comprises at least one of diglycidyl ether of bisphenol A epoxy resin, polyepoxide obtained by reacting an epihalohydrin with at least one member selected from the group consisting of polyhydric phenol and polyhydric alcohol, and combination of both.

4. The resin-clay composition of claim 1, wherein the curing agent comprises at least one of a cyclo-aliphatic amine, cyclo-aliphatic amine, group of aliphatic amines, cycloaliphatic amines, imidazoles, tertiary amines, aromatic amines, and their combinations.

5. The resin-clay composition of claim 1, wherein the at least one exchangeable cation comprises at least one of stearyl ammonium, hydrogenated tallow ammonium, dimethyl dihydrogenated tallow, and ammonium.

6. The resin-clay composition of claim 1, wherein the change in curing time is an increase in curing time.

7. A method for mitigating particulate migration during hydrocarbon production comprising:
adding a nano-clay into an epoxy resin to create a first mixture; wherein the nano-clay forms two-dimensional sheets with the epoxy resin and has at least one exchangeable cation separating the two-dimensional sheets, wherein the two dimensional sheets further comprise at least one of tetrahedral and octahedral sheet, and
adding an amine based curing agent into the first mixture to create a second mixture; wherein the second mixture comprises up to 20 weight percent of the nano-clay, up to 90 weight percent of the epoxy resin, and up to 90 weight percent of the curing agent; wherein the nano-clay modifies a surface of the epoxy resin to affect curing time of the epoxy resin.

8. The method of claim 7, further comprising:
mixing the first mixture for a predetermined amount of time prior to adding the curing agent.

9. The method of claim 7, further comprising:
inserting the second mixture into a hydrocarbon well for mitigating particulate migration during hydrocarbon production.

10. The method of claim 9, further comprising:
mixing the second mixture for a predetermined amount of time prior to inserting the second mixture into a hydrocarbon well.

11. The method of claim 7, wherein the epoxy resin comprises at least one of diglycidyl ether of bisphenol A epoxy resin, polyepoxide obtained by reacting an epihalohydrin with at least one member selected from the group consisting of polyhydric phenol and polyhydric alcohol, and combination of both.

12. The method of claim 7, wherein the curing agent comprises at least one of a cyclo-aliphatic amine, cycloaliphatic amine, group of aliphatic amines, cycloaliphatic amines, imidazoles, tertiary amines, aromatic amines, and their combinations.

13. A resin-clay composition comprising:
an epoxy resin system prepared from an epoxy resin and an amine based curing agent; and
a nano-clay having two-dimensional sheets with the epoxy resin and at least one exchangeable cation separating the two-dimensional sheets,
wherein the two dimensional sheets further comprise at least one of tetrahedral and octahedral sheet,
wherein the composition comprises up to 20 weight percent of the nano-clay, up to 90 weight percent of the epoxy resin, and up to 90 weight percent of the curing agent, and
wherein the nano-clay modifies a surface of the epoxy resin to affect curing time of the epoxy resin.

* * * * *